(12) United States Patent
Parkinson et al.

(10) Patent No.: US 9,442,290 B2
(45) Date of Patent: Sep. 13, 2016

(54) HEADSET COMPUTER OPERATION USING VEHICLE SENSOR FEEDBACK FOR REMOTE CONTROL VEHICLE

(71) Applicant: Kopin Corporation, Taunton, MA (US)

(72) Inventors: Christopher Parkinson, Richland, WA (US); Stephen A. Pombo, Campbell, CA (US); Jeffrey J. Jacobsen, Hollister, CA (US); David Hollick, Nottinghamshire (GB)

(73) Assignee: Kopin Corporation, Westborough, MA (US)

( * ) Notice: Subject to any disclaimer, the term of this patent is extended or adjusted under 35 U.S.C. 154(b) by 467 days.

(21) Appl. No.: 13/830,931

(22) Filed: Mar. 14, 2013

(65) Prior Publication Data

US 2013/0300649 A1 Nov. 14, 2013

Related U.S. Application Data

(63) Continuation-in-part of application No. 13/468,207, filed on May 10, 2012.

(60) Provisional application No. 61/749,196, filed on Jan. 4, 2013.

(51) Int. Cl.
*H04N 7/18* (2006.01)
*G02B 27/01* (2006.01)
(Continued)

(52) U.S. Cl.
CPC ........... *G02B 27/017* (2013.01); *G05D 1/0016* (2013.01); *G05D 1/0038* (2013.01);
(Continued)

(58) Field of Classification Search
USPC ........................................................ 348/158
See application file for complete search history.

(56) References Cited

U.S. PATENT DOCUMENTS 5,005,213 A 4/1991 Hanson et al.
5,594,469 A 1/1997 Freeman et al.
(Continued)

FOREIGN PATENT DOCUMENTS

WO WO 95/21408 8/1995
WO WO 95/23994 9/1995
(Continued)

OTHER PUBLICATIONS

European Search Report for EP 12782481.1 dated Sep. 29, 2014.
(Continued)

*Primary Examiner* — Tracy Li
(74) *Attorney, Agent, or Firm* — Hamilton, Brook, Smith & Reynolds, P.C.

(57) ABSTRACT

A system performs stable control of moving devices (such as a helicopter or robot) with attached camera(s), providing live imagery back to a head-mounted computer (HMC). The HMC controls the moving device. The HMC user specifies a desired path or location for the moving device. Camera images enable the user-specified instructions to be followed accurately and the device's position to be maintained thereafter. A method of controlling a moving device with a headset computer includes analyzing, at the headset computer, at least one image received from the moving device to form an indication of change in position of the moving device. The method displays to a user of the headset computer the indication of change in position of the moving device. The method can additionally include enabling the user to control the moving device.

16 Claims, 7 Drawing Sheets

(51) Int. Cl.
*G05D 1/00* (2006.01)
*G06F 1/16* (2006.01)
*G06F 3/01* (2006.01)
*G06F 3/0346* (2013.01)

(52) U.S. Cl.
CPC .............. *G06F 1/163* (2013.01); *G06F 3/011* (2013.01); *G06F 3/012* (2013.01); *G06F 3/0346* (2013.01); *B64C 2201/146* (2013.01); *G02B 2027/014* (2013.01); *G02B 2027/0138* (2013.01); *G02B 2027/0187* (2013.01)

(56) References Cited

U.S. PATENT DOCUMENTS

| | | |
|---|---|---|
| 5,990,793 A | 11/1999 | Bieback |
| 6,010,216 A | 1/2000 | Jesiek |
| 6,084,556 A | 7/2000 | Zwern |
| 6,108,197 A | 8/2000 | Janik |
| 6,198,462 B1 | 3/2001 | Daily et al. |
| 6,204,974 B1 | 3/2001 | Spitzer |
| 6,313,864 B1 | 11/2001 | Tabata et al. |
| 6,325,507 B1 | 12/2001 | Jannard |
| 6,369,952 B1 | 4/2002 | Rallison et al. |
| 6,778,906 B1 | 8/2004 | Hennings et al. |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,501,995 B2 | 3/2009 | Morita et al. |
| 7,512,414 B2 | 3/2009 | Jannard et al. |
| 7,620,432 B2 | 11/2009 | Willins et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,184,983 B1 | 5/2012 | Ho et al. |
| 8,212,859 B2 | 7/2012 | Tang et al. |
| 8,855,719 B2 | 10/2014 | Jacobsen et al. |
| 8,862,186 B2 | 10/2014 | Jacobsen et al. |
| 8,929,954 B2 | 1/2015 | Jacobsen et al. |
| 2001/0003712 A1 | 6/2001 | Roelofs |
| 2002/0015008 A1 | 2/2002 | Kishida et al. |
| 2002/0030649 A1 | 3/2002 | Zavracky et al. |
| 2002/0044152 A1 | 4/2002 | Abbott, III et al. |
| 2002/0094845 A1 | 7/2002 | Inasaka |
| 2002/0154070 A1 | 10/2002 | Sato et al. |
| 2003/0016253 A1 | 1/2003 | Aoki et al. |
| 2003/0067536 A1 | 4/2003 | Boulanger et al. |
| 2003/0068057 A1 | 4/2003 | Miller et al. |
| 2004/0113867 A1 | 6/2004 | Tomine et al. |
| 2004/0193413 A1 | 9/2004 | Wilson et al. |
| 2004/0210852 A1 | 10/2004 | Balakrishnan et al. |
| 2004/0267527 A1 | 12/2004 | Creamer et al. |
| 2005/0114140 A1 | 5/2005 | Brackett et al. |
| 2005/0237296 A1 | 10/2005 | Lee |
| 2005/0245292 A1 | 11/2005 | Bennett et al. |
| 2005/0264527 A1 | 12/2005 | Lin |
| 2006/0010368 A1 | 1/2006 | Kashi |
| 2006/0028400 A1 | 2/2006 | Lapstun et al. |
| 2006/0061551 A1 | 3/2006 | Fateh |
| 2006/0109237 A1 | 5/2006 | Morita et al. |
| 2006/0132382 A1 | 6/2006 | Jannard |
| 2006/0178085 A1 | 8/2006 | Sotereanos et al. |
| 2006/0221266 A1 | 10/2006 | Kato et al. |
| 2006/0238877 A1* | 10/2006 | Ashkenazi et al. ........... 359/630 |
| 2007/0009125 A1 | 1/2007 | Frerking et al. |
| 2007/0030174 A1 | 2/2007 | Randazzo et al. |
| 2007/0103388 A1 | 5/2007 | Spitzer |
| 2007/0180979 A1 | 8/2007 | Rosenberg |
| 2007/0220108 A1 | 9/2007 | Whitaker |
| 2007/0265495 A1 | 11/2007 | Vayser |
| 2008/0055194 A1 | 3/2008 | Baudino et al. |
| 2008/0084992 A1 | 4/2008 | Peddireddy et al. |
| 2008/0120141 A1 | 5/2008 | Kariathungal et al. |
| 2008/0144854 A1 | 6/2008 | Abreu |
| 2008/0180640 A1 | 7/2008 | Ito |
| 2008/0198324 A1 | 8/2008 | Fuziak |
| 2008/0200774 A1 | 8/2008 | Luo |
| 2008/0239080 A1 | 10/2008 | Moscato |
| 2009/0002640 A1 | 1/2009 | Yang et al. |
| 2009/0079839 A1 | 3/2009 | Fischer et al. |
| 2009/0093304 A1 | 4/2009 | Ohta |
| 2009/0099836 A1 | 4/2009 | Jacobsen et al. |
| 2009/0117890 A1 | 5/2009 | Jacobsen et al. |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0182562 A1 | 7/2009 | Caire et al. |
| 2009/0204410 A1 | 8/2009 | Mozer et al. |
| 2009/0251409 A1 | 10/2009 | Parkinson et al. |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0073201 A1* | 3/2010 | Holcomb et al. ............. 340/990 |
| 2010/0117930 A1 | 5/2010 | Bacabara et al. |
| 2010/0119052 A1 | 5/2010 | Kambli |
| 2010/0121480 A1 | 5/2010 | Stelzer et al. |
| 2010/0128626 A1 | 5/2010 | Anderson et al. |
| 2010/0141554 A1 | 6/2010 | Devereaux et al. |
| 2010/0156812 A1 | 6/2010 | Stallings et al. |
| 2010/0164990 A1 | 7/2010 | Van Doorn |
| 2010/0171680 A1 | 7/2010 | Lapidot et al. |
| 2010/0182137 A1 | 7/2010 | Pryor |
| 2010/0238184 A1 | 9/2010 | Janicki |
| 2010/0245585 A1 | 9/2010 | Fisher et al. |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2010/0302137 A1 | 12/2010 | Benko et al. |
| 2010/0309295 A1 | 12/2010 | Chow |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0092825 A1 | 4/2011 | Gopinathan et al. |
| 2011/0134910 A1 | 6/2011 | Chao-Suren et al. |

(56) References Cited

U.S. PATENT DOCUMENTS

| | | |
|---|---|---|
| 2011/0187640 A1 | 8/2011 | Jacobsen et al. |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0068914 A1 | 3/2012 | Jacobsen et al. |
| 2012/0075177 A1 | 3/2012 | Jacobsen et al. |
| 2012/0089392 A1 | 4/2012 | Larco et al. |
| 2012/0092208 A1* | 4/2012 | LeMire et al. ............... 342/29 |
| 2012/0105740 A1 | 5/2012 | Jannard et al. |
| 2012/0110456 A1 | 5/2012 | Larco et al. |
| 2012/0114131 A1 | 5/2012 | Tricoukes et al. |
| 2012/0173100 A1* | 7/2012 | Ellis ........................... 701/54 |
| 2012/0188245 A1 | 7/2012 | Hyatt |
| 2012/0236025 A1 | 9/2012 | Jacobsen et al. |
| 2012/0287284 A1 | 11/2012 | Jacobsen et al. |
| 2012/0294549 A1* | 11/2012 | Doepke ............... G06T 3/4038 382/294 |
| 2013/0174205 A1 | 7/2013 | Jacobsen et al. |
| 2013/0231937 A1 | 9/2013 | Woodall et al. |
| 2013/0274985 A1* | 10/2013 | Lee et al. ..................... 701/23 |
| 2013/0289971 A1 | 10/2013 | Parkinson |
| 2013/0300649 A1 | 11/2013 | Parkinson et al. |
| 2014/0235169 A1 | 8/2014 | Parkinson et al. |
| 2014/0368412 A1 | 12/2014 | Jacobsen et al. |
| 2015/0072672 A1 | 3/2015 | Jacobsen et al. |

FOREIGN PATENT DOCUMENTS

| | | |
|---|---|---|
| WO | WO 00/79327 | 12/2000 |
| WO | WO 2009/076016 | 6/2009 |
| WO | WO 2011/051660 | 5/2011 |
| WO | WO 2011/097226 A1 | 8/2011 |
| WO | WO 2011/114149 A1 | 9/2011 |
| WO | WO 2012/040386 | 3/2012 |

OTHER PUBLICATIONS

International Preliminary Report on Patentability and Written Opinion, PCT/US2011/023337, mailing date, "Wireless Hands-Free Computing Headset with Detachable Accessories Controllable by Motion, Body Gesture and/or Vocal Commands", Aug. 16, 2012, 8 pages.

Notification of Transmittal of International Search Report and Written Opinion of PCT/US2012/068686, "Wireless Hands-Free Computing Head Mounted Video Eyewear for Local/Remote Diagnosis and Repair", Date of Mailing: Mar. 25, 2013, 11 pages.

Notification of Transmittal of International Search Report and Written Opinion of PCT/US2012/037284, "Wireless Hands-Free Computing Head Mounted Video Eyewear for Local/Remote Diagnosis and Repair", dated Oct. 1, 2012.

Notification Concerning Transmittal of International Preliminary Report on Patentability of PCT/US2012/037284, "Headset Computer That Uses Motion and Voices to Control Information Display and Remote Devices", Date of Mailing: Nov. 21, 2013, 7 pages.

EP 12782481.1 Supplemental European Search Report, "Context Sensitive Overlays in Voice Controlled Headset Computer Displays," dated Sep. 29, 2014.

Morphew, M.E., et al., "Helmet Mounted Displays for Unmanned Aerial Vehicle Control", Proceedings of SPIE, vol. 5442, Oct. 20, 2004.

International Search Report and Written Opinion for PCT/US2013/065927 dated Mar. 21, 2014, entitled "Improved Headset Computer Operation Using Vehicle Sensor Feedback for Remote Control Vehicle".

International Preliminary Report on Patentability for PCT/US2013/065927 dated Jul. 16, 2015 entitled "Improved Headset Computer Operation Using Vehicle Sensor Feedback for Remote Control Vehicle".

* cited by examiner

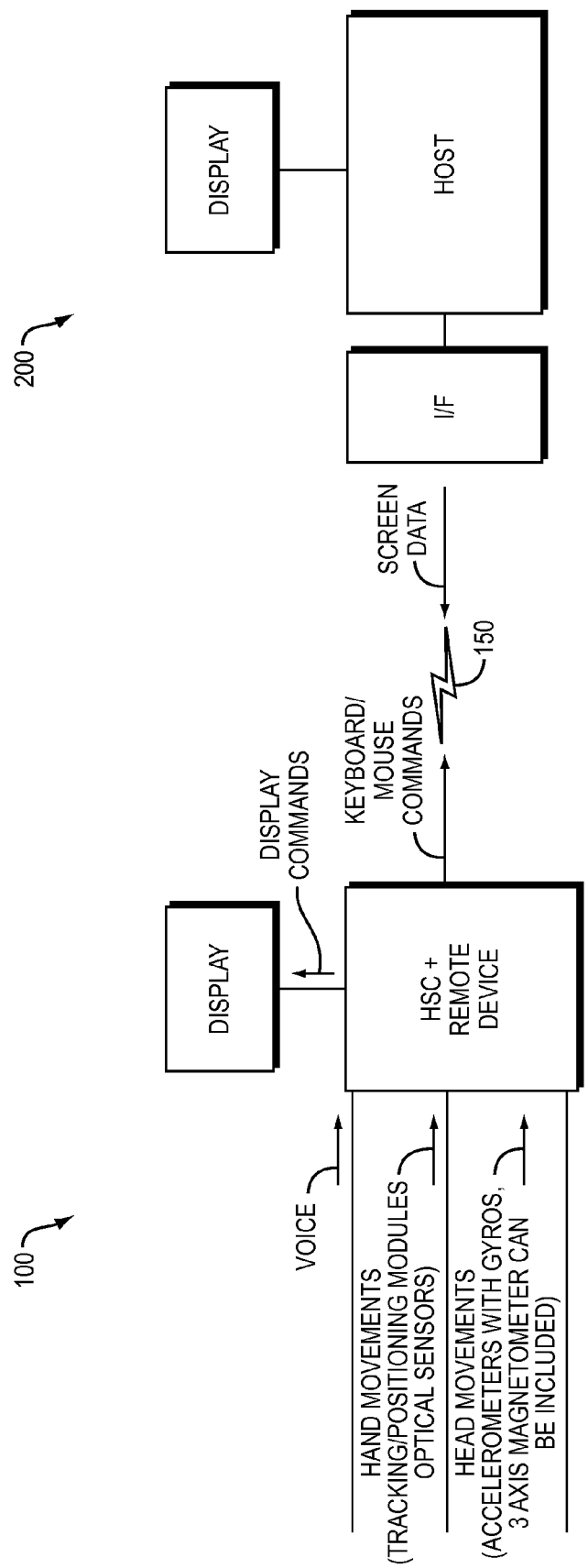

HEADSET COMPUTER OPERATION USING VEHICLE SENSOR FEEDBACK FOR REMOTE CONTROL VEHICLE

RELATED APPLICATIONS

This application claims the benefit of U.S. Provisional Application No. 61/749,196, filed on Jan. 4, 2013 and is a continuation-in-part of U.S. application Ser. No. 13/468,207, filed May 10, 2012. The entire teachings of the above applications are incorporated herein by reference.

BACKGROUND

Mobile computing devices, such as notebook PCs, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplay's can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices. For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

Embodiments of the present invention provide a way to implement stable remote control of moving devices (such as a helicopter or robot) that have one or more cameras attached, providing live imagery back to the controlling device, a head-mounted or headset computer (HMC or HSC) or other computer device. The user specifies how he wants the moving device to move. This invention uses analysis of the camera images to enable those instructions (user specified) to be followed accurately and the moving device's position to be maintained thereafter.

In one embodiment, a method of controlling a moving device with a headset computer includes analyzing, at the headset computer, at least one image received from the moving device to form an indication of change in position of the moving device. The method further can include displaying to a user of the headset computer the indication of change in position of the moving device. The method can additionally include enabling the user to control the moving device.

In another embodiment, the method can enable the user to control the moving device by user input. The user input can be head movement, hand gesture, voice command, or a digital command.

In another embodiment, the method can include transmitting at least one directional or angular command to the moving device.

In another embodiment, analyzing the at least one image further can include transmitting the at least one image to a host computer to perform the analysis and also include receiving the analysis from the host computer. The method can further include coupling the headset computer and the host computer for communication over a wireless transport. In another embodiment, the method can include coupling the headset computer and the moving device for communication over a wireless transport.

In another embodiment, the method can further include displaying, to the user, the at least one images from the moving device. The method can also include overlaying the indication of change of the moving device on the at least one images.

In another embodiment, enabling the user to control the device can further include analyzing user input, comparing the user input to a limit of the moving device, and reducing movement commands to the movement device to be within the limit.

In another embodiment, enabling the user to control the device can further include sending commands to an autopilot of the motion device.

In another embodiment, a system for controlling a moving device with a headset computer can include an analysis module configured to analyze, at the headset computer, at least one image received from the moving device to form an indication of change in position of the moving device. The system can further include a display configured to display to a user of the headset computer the indication of change in position of the moving device. The system can additionally include a control module configured to enable the user to control the moving device.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a block diagram of flow of data and control in the embodiment of FIGS. 1A-1B.

DETAILED DESCRIPTION

Figure 1A:
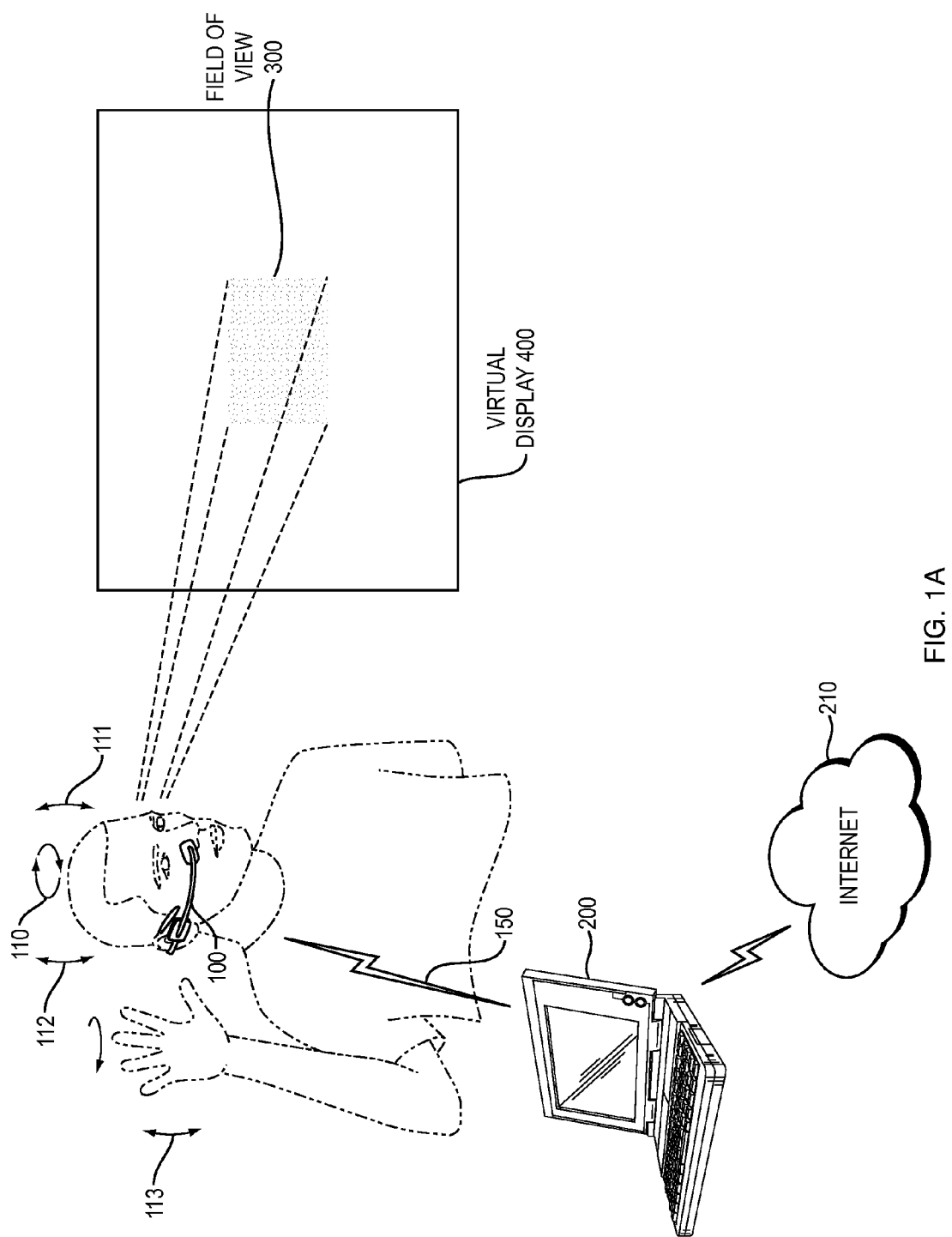
FIGS. 1A-1B are schematic illustrations of a headset computer cooperating with a host computer (e.g., Smart Phone, laptop, etc.) according to principles of the present invention.
Figure 1B:
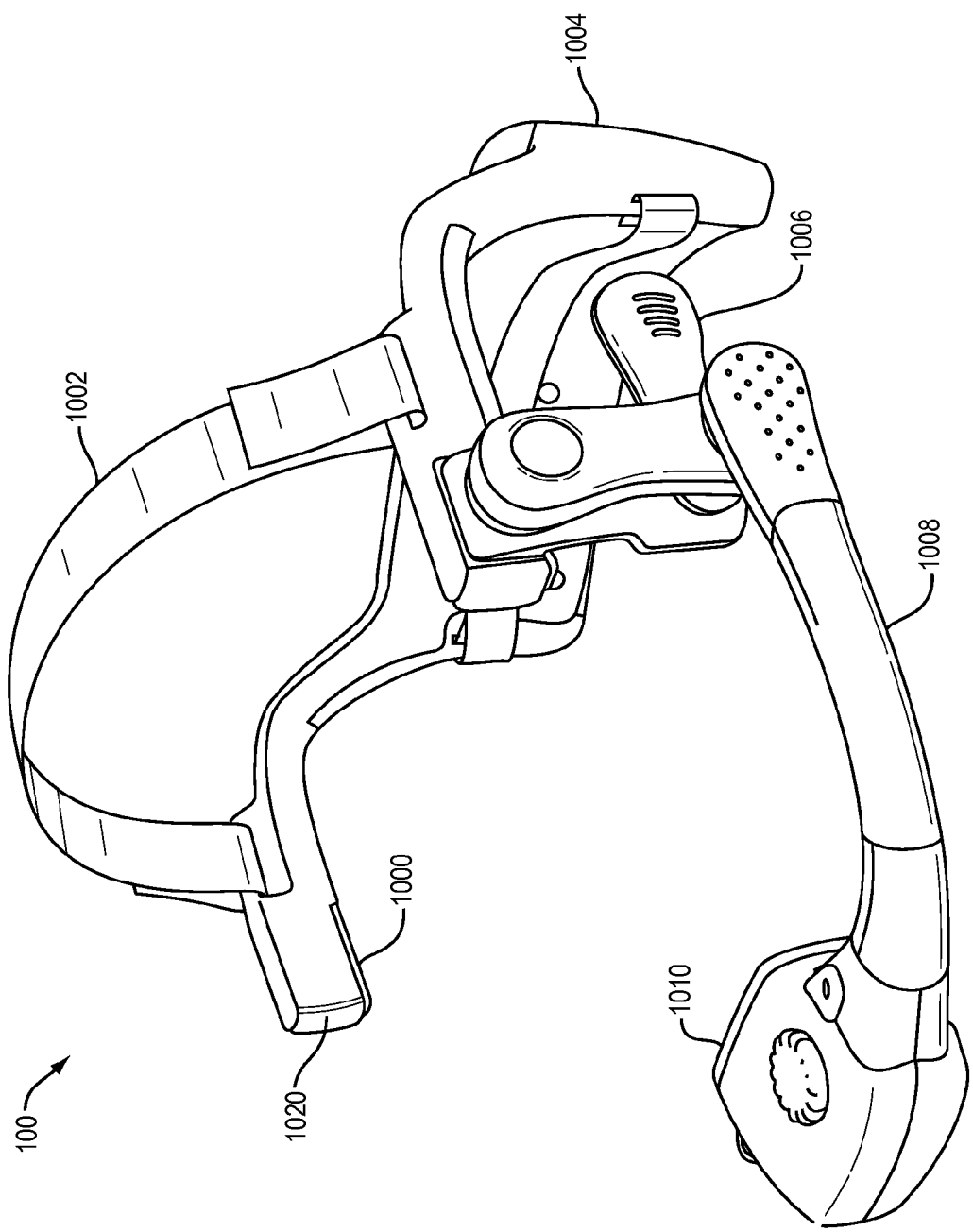

FIGS. 1A and 1B show example embodiments of a wireless computing headset device 100 (also referred to herein as a headset computer (HSC) or head mounted computer (HMC)) that incorporates a high-resolution (VGA or better) microdisplay element 1010, an image analysis system (analyzer) and other features described below. HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. Microphone(s) operatively coupled or preferably integrated into the HSC 100 can be used to capture speech commands which are then digitized and processed using automatic speech recognition techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. Such a user interface overcomes the hands-dependant formats of other mobile devices.

The headset computing device 100 can be used in various ways. It can be used as a remote display for streaming video signals received from a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The host may be further connected to other networks 210, such as the Internet. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. The microprocessor is configured for image analysis used to control (e.g. remotely control) a moving vehicle or object according to principles of the present invention. Speakers 1006 provide audio output to the user so that the user can hear information. Microdisplay subassembly 1010 is used to render visual information to the user. It is coupled to the arm 1008. The arm 1008 generally provides physical support such that the microdisplay subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC or HMC display device 100 allows a user to select a field of view 300 within a much larger area defined by a virtual display 400. The user can typically control the position, extent (e.g., X-Y or 3D range), and/or magnification of the field of view 300.

FIGS. 1A-1B show an example embodiment of a monocular microdisplay presenting a single fixed display element supported on the face of the user with a cantilevered boom. Other mechanical configurations for the remote control display device 100 are possible.

FIG. 2 is a block diagram 2000 showing additional details of an example embodiment of the HSC 100, host 200 and the data that travels between them. The HSC 100 receives vocal input from the user via the microphone, hand movements 2002 or body gestures via positional and orientation sensors, the camera or optical sensor(s), and head movement inputs 2004 via the head tracking circuitry such as 3 axis to 9 axis degrees of freedom orientational sensing. These are translated by software in the HSC 100 into keyboard and/or mouse commands 2008 that are then sent over the Bluetooth or other wireless interface 150 to the host 200. The host 200 then interprets these translated commands in accordance with its operating system/application software to perform various functions. Among the commands is one to select a field of view 300 within the virtual display 400 and return that selected screen data to the HSC 100. Thus, it should be understood that a very large format virtual display area might be associated with application software or an operating system running on the host 200. However, only a portion of that large virtual display area 400 within the field of view 300 is returned to and actually displayed by the micro display 1010 of HSC 100.

A moving object (for a nonlimiting example of a vehicle) of interest is coupled to the HMC 100 or other computer device 200 (the connection type is not important provided camera images from the object can be streamed to the HMC in real time). The moving object sends images from at least one camera to the HMC 100 or other computer device 200. The camera may be that of another HMC or HSC 100 worn by a passenger of the moving vehicle, for example, instead of the HMC remotely controlling the vehicle.

The HMC 100 or other computer device 200 runs software or otherwise implements an image analyzer that monitors changes in the position of objects in the camera images to calculate whether the moving object/vehicle is correctly following a desired course or maintaining position if no desired course is provided. Where discrepancies are detected between the desired course and the moving object's current position, the instructions to the moving object/vehicle may be adjusted to compensate and bring the moving object/vehicle into the desired position.

Figure 3:
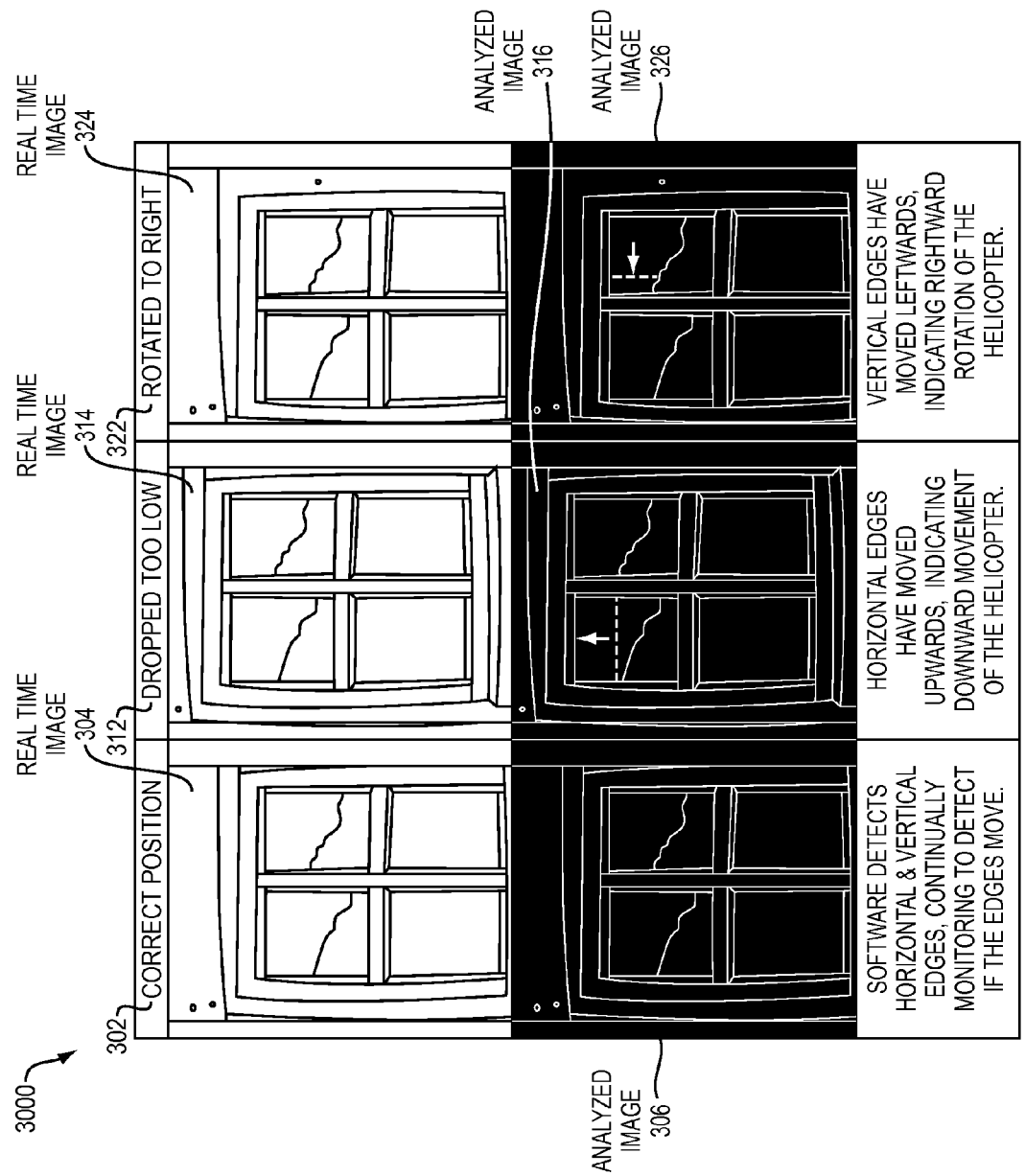
FIG. 3 is a diagram 3000 showing an example embodiment of a front facing camera view of a motion device (e.g., a helicopter) hovering in front of window.

FIG. 3 is a diagram 3000 showing an example embodiment of front facing camera views of a motion device (e.g., a helicopter) hovering in front of window. The operator is instructing the helicopter to remain stationary. The HMC 100 or computer host 200 executing the invention software processes the received real time images 304, 314 and 324 to detect horizontal and vertical edges, as shown in the analyzed images 306, 316, and 326. The HMC 100 selects clearly detectable edges and monitors them for movement from frame to frame to determine movement of the helicopter.

When the camera is in the correct position 302, the analyzed image 306, corresponding with the real time image 304, shows detected horizontal and vertical edges. The HSC 100 continually monitors the edges in subsequent frames to determine whether the helicopter has moved.

After the camera has dropped too low 312, the detected edges have moved upwards in the real time image 314, shown by the dotted line and arrow in analyzed image 316. In response, the analysis system (generally at 100, 200) causes the helicopter system (or operator) to increase rotor power for a short time to bring the helicopter back up to the required level.

After the camera has rotated to the right 322, the detected edges shift to the left in real time image 324, shown by the dotted line and arrow in analyzed image 326. In response, the system/analyzer 100, 200 enables the helicopter operator to adjust the tail fin/rotor to rotate the helicopter back to the correct position 302.

If the operator wants to move the helicopter by a small amount, he can specify horizontal and vertical deltas, and in response, the autopilot software of the helicopter adjusts the desired edge positions accordingly. The operator can specify the horizontal and vertical deltas by manual entry (e.g., with a keyboard and mouse) or by hand gesture, head tracking, body gesture, etc. Then the auto-adjustment process (e.g., the image analyzer feeding to the vehicle autopilot system) causes the helicopter to move to the new position to match the desired edge positions.

If the operator wants to move the helicopter to a new location entirely, he can temporarily suspend the automatic position control (analyzer of the present invention coupled to helicopter auto pilot) and fly the helicopter using direct control (e.g., a joystick, manual entry, body movement, head tracking, or hand gestures) until the helicopter reaches the desired position. The helicopter can re-engage automatic position control to fine tune the desired position. Further, automatic position control can remain enabled during direct control to maintain orientation and prevent stalling and/or crashing of the helicopter.

In one embodiment the HSC 100 may take the form of the HSC described in a co-pending U.S. Patent Publication Number 2011/0187640 which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small and includes instructions on how to lay out a screen, text to display, and other stylistic information such as drawing arrows, background color(s), or images to include, etc.

Additional data can be streamed over the same 150 or another connection and displayed on screen 1010, such as a video stream if required by the Controller 200.

The user can control the motion device by moving his or her head. The HSC tracks these movements using head tracking technology. For example, a user that turns his or her head to the right causes the motion device to turn to the right a proportional amount of degrees. The HSC moves the desired path/position/course in the analyzed image to the right, and then allows the auto-course adjustment to take place as described above. Similarly, the HSC can adjust the course if the user looks up or down. Other movements, such as moving forward or backward, can accelerate or decelerate the motion device. As such, the HSC combines analysis of head tracking movements with images received from the motion device to provide an intuitive, motion based, hands free control of the motion device.

Figure 4:
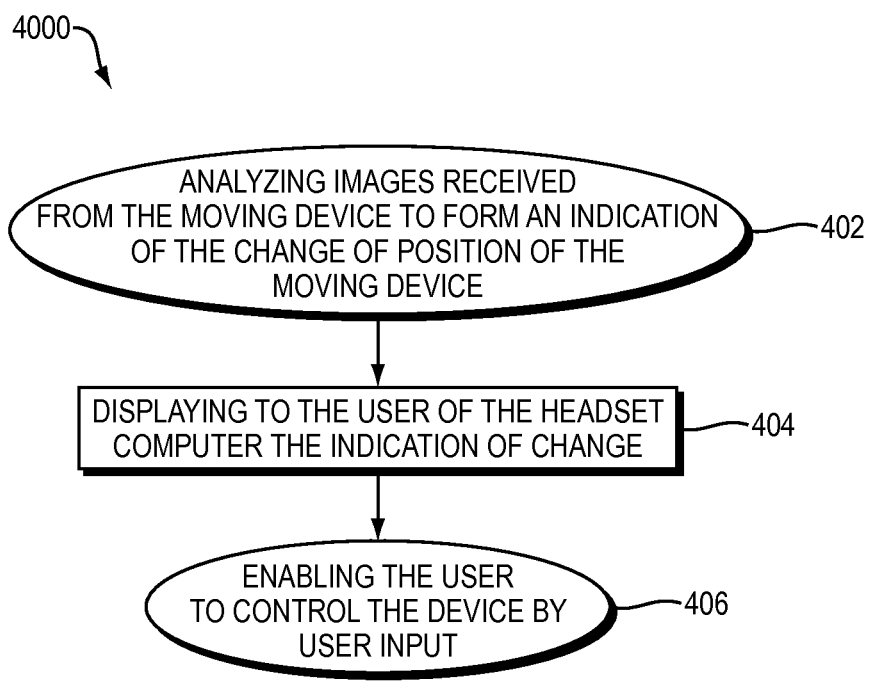
FIG. 4 is a block diagram 4000 illustrating an example embodiment of a method employed by the headset computer.

FIG. 4 is a block diagram 4000 illustrating an example embodiment of a method employed by the headset computer. The method first analyzes images received from the moving device to form an indication of the change of position of the moving device (402). The method then displays, to the user of the headset computer, the indication of the change (404). Then, the method enables the user to control the device by user input (406).

Figure 5:
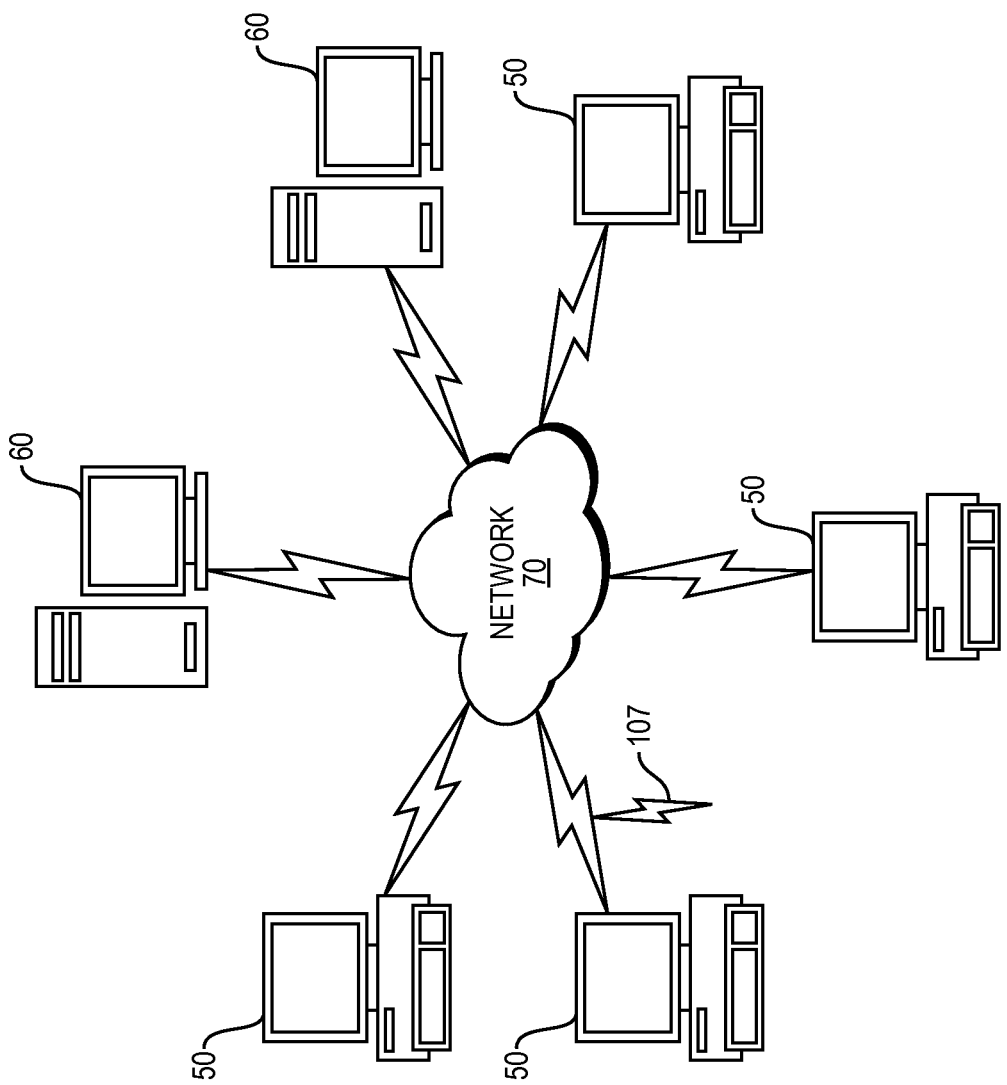
FIG. 5 illustrates a computer network or similar digital processing environment in which the present invention may be implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
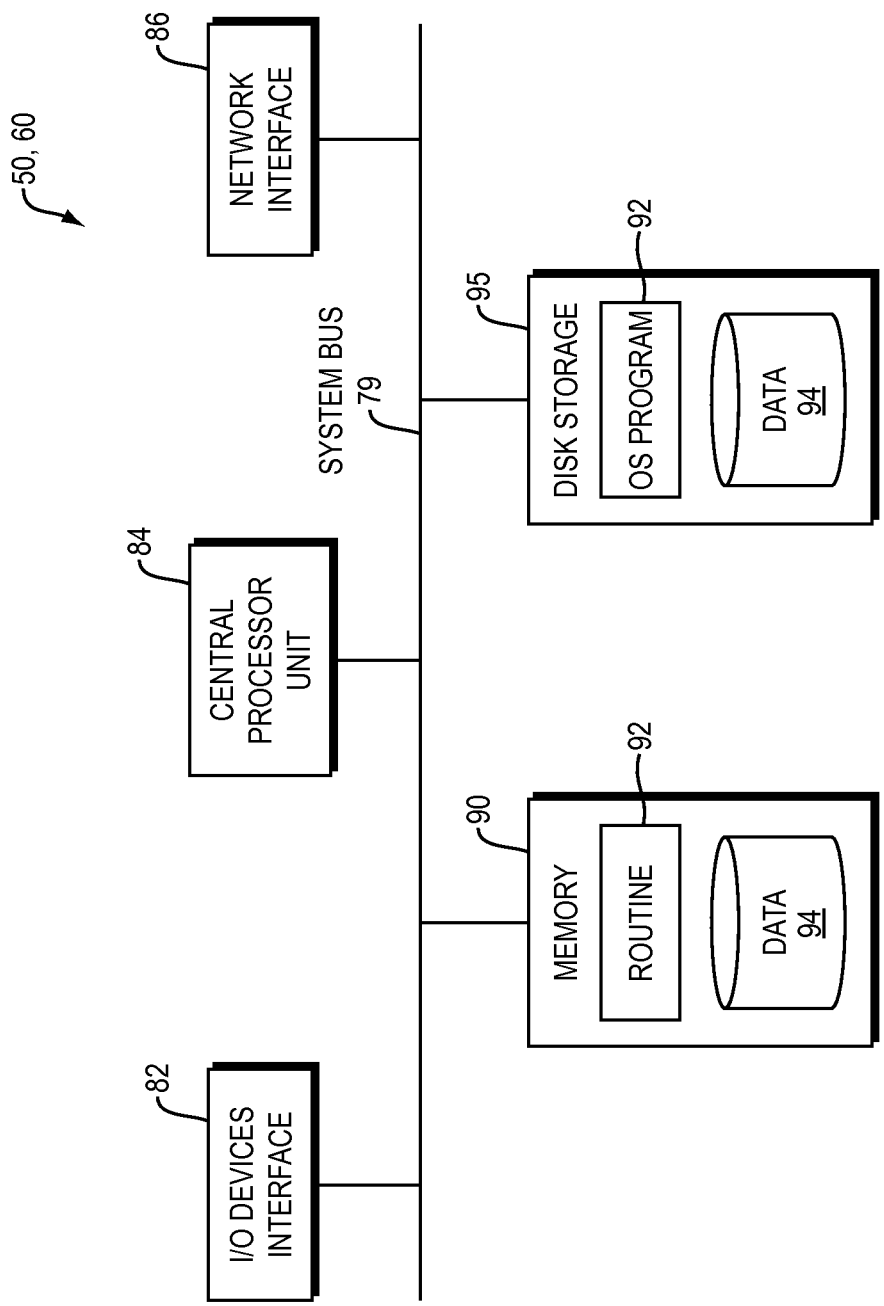
FIG. 6 is a diagram of the internal structure of a computer (e.g., client processor/device or server computers) in the computer system of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., analyzer module, display module, and control module code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling a moving device with a headset computer, the method comprising:
   analyzing, at the headset computer, at least one image received from the moving device to form an indication of change in position of the moving device based on changes in position of one or more objects in the at least one image;
   displaying to a user of the headset computer the indication of change in position of the moving device; and
   enabling the user to control the moving device by analyzing user input, comparing the user input to a limit of the moving device, and reducing movement commands to the movement device to be within the limit.

2. The method of claim 1, further comprising enabling the user to control the moving device by user input, the user input being at least one of head movement, hand gesture, voice command, or digital command.

3. The method of claim 1, further comprising transmitting at least one directional or angular command to the moving device.

4. The method of claim 1, wherein analyzing the at least one image further includes transmitting the at least one image to a host computer to perform the analysis and receiving the analysis from the host computer.

5. The method of claim 4, further comprising coupling the headset computer and the host computer for communication over a wireless transport.

6. The method of claim 1, further comprising coupling the headset computer and the moving device for communication over a wireless transport.

7. The method of claim 1, further comprising, displaying, to the user, the at least one images from the moving device, and further overlaying the indication of change of the moving device on the at least one images.

8. The method of claim 1, wherein enabling the user to control the device further includes sending commands to an autopilot of the motion device.

9. A system for controlling a moving device with a headset computer, the system comprising:
   an analysis module configured to analyze, at the headset computer, at least one image received from the moving device to form an indication of change in position of the moving device based on changes in position of an object in the at least one image;
   a display configured to display to a user of the headset computer the indication of change in position of the moving device; and
   a control module configured to enable the user to control the moving device by analyzing user input, comparing the user input to a limit of the moving device, and reducing movement commands to the movement device to be within the limit.

10. The system of claim 9, wherein the control module is further configured to enable the user to control the moving device by user input, the user input being at least one of head movement, hand gesture, voice command, or digital command.

11. The system of claim 9, further comprising transmitting at least one directional or angular command to the moving device.

12. The system of claim 9, wherein the analysis module is further configured to transmit the at least one image to a host computer to perform the analysis and receive the analysis from the host computer.

13. The system of claim 12, wherein the headset computer and the host computer are coupled for communication over a wireless transport.

14. The system of claim 9, wherein the headset computer and the moving device are coupled for communication over a wireless transport.

15. The system of claim 9, wherein the display module is further configured to display, to the user, the at least one images from the moving device, and further configured to overlay the indication of change of the moving device on the at least one images.

16. The system of claim 9, wherein the control module is further configured to send commands to an autopilot of the motion device.

* * * * *